US008781281B2

(12) United States Patent
Kachmar

(10) Patent No.: US 8,781,281 B2
(45) Date of Patent: Jul. 15, 2014

(54) DROP CABLE WITH ANGLED REINFORCING MEMBER CONFIGURATIONS

(75) Inventor: Wayne M. Kachmar, North Bennington, VT (US)

(73) Assignee: ADC Telecommunications, Inc., Berwyn, PA (US)

( * ) Notice: Subject to any disclaimer, the term of this patent is extended or adjusted under 35 U.S.C. 154(b) by 28 days.

(21) Appl. No.: 13/555,659

(22) Filed: Jul. 23, 2012

(65) Prior Publication Data
US 2013/0028562 A1 Jan. 31, 2013

Related U.S. Application Data

(60) Provisional application No. 61/510,334, filed on Jul. 21, 2011.

(51) Int. Cl.
G02B 6/44 (2006.01)
(52) U.S. Cl.
CPC ............ *G02B 6/4494* (2013.01); *G02B 6/4477* (2013.01); *G02B 6/4429* (2013.01)
USPC .......................................... 385/114; 385/100
(58) Field of Classification Search
CPC .. G02B 6/4492; G02B 6/4494; G02B 6/4496; G02B 6/4403; G02B 6/4404; G02B 6/4429; G02B 6/4432; G02B 6/448; G02B 6/3887; G02B 6/4477; G02B 6/4478
USPC .......... 385/114, 102, 113, 100, 124, 126, 127
See application file for complete search history.

(56) References Cited

U.S. PATENT DOCUMENTS

| 3,911,041 A | 10/1975 | Kaeding et al. |
| 4,067,852 A | 1/1978 | Calundann |
| 4,083,829 A | 4/1978 | Calundann et al. |
| 4,089,585 A | 5/1978 | Slaughter et al. |

(Continued)

FOREIGN PATENT DOCUMENTS

| DE | 25 13 723 A1 | 10/1976 |
| DE | 20 2007 006 658 U1 | 8/2007 |

(Continued)

OTHER PUBLICATIONS

Fiber Optic Cable LCF™ Micocable: Plenum, Spec Sheet, ADC Telecommunications, Inc., 4 pages (Aug. 2005).

(Continued)

*Primary Examiner* — Ellen Kim
(74) *Attorney, Agent, or Firm* — Merchant & Gould P.C.

(57) ABSTRACT

A fiber optic cable includes an outer jacket, an optical fiber ribbon, and reinforcing member configurations. The outer jacket has an elongated transverse cross-sectional profile that defines a major axis and a minor axis that meet at a lengthwise axis of the fiber optic cable. The outer jacket defines a central fiber passage that extends through the outer jacket along a lengthwise axis of the outer jacket. The optical fiber ribbon is positioned within the central fiber passage. The reinforcing member configurations are positioned within the outer jacket on opposite sides of the central fiber passage. Each of the reinforcing member configurations has a transverse cross-sectional profile that includes first and second legs that are angled relative to one another such that they diverge as the first and second legs extend toward the minor axis.

2 Claims, 5 Drawing Sheets

(56) References Cited

U.S. PATENT DOCUMENTS

| | | | |
|---|---|---|---|
| 4,130,545 A | 12/1978 | Calundann | |
| 4,161,470 A | 7/1979 | Calundann | |
| 4,199,225 A | 4/1980 | Slaughter et al. | |
| 4,304,462 A | 12/1981 | Baba et al. | |
| 4,318,842 A | 3/1982 | East et al. | |
| 4,359,598 A | 11/1982 | Dey et al. | |
| 4,401,361 A | 8/1983 | Slaughter | |
| 4,420,220 A | 12/1983 | Dean et al. | |
| 4,468,364 A | 8/1984 | Ide | |
| 4,515,435 A | 5/1985 | Anderson | |
| 4,553,815 A | 11/1985 | Martin | |
| 4,569,420 A | 2/1986 | Pickett et al. | |
| 4,659,174 A | 4/1987 | Ditscheid et al. | |
| 4,715,677 A | 12/1987 | Saito et al. | |
| 4,729,628 A | 3/1988 | Kraft et al. | |
| 4,730,894 A | 3/1988 | Arroyo | |
| 4,761,053 A | 8/1988 | Cogelia et al. | |
| 4,807,962 A | 2/1989 | Arroyo et al. | |
| 4,810,834 A | 3/1989 | Grogl et al. | |
| 4,818,060 A | 4/1989 | Arroyo | |
| 4,844,575 A | 7/1989 | Kinard et al. | |
| 4,852,965 A | 8/1989 | Mullin et al. | |
| 4,895,427 A | 1/1990 | Kraft | |
| 4,909,592 A | 3/1990 | Arroyo et al. | |
| 5,015,063 A | 5/1991 | Panuska et al. | |
| 5,125,063 A | 6/1992 | Panuska et al. | |
| 5,157,752 A | 10/1992 | Greveling et al. | |
| 5,185,844 A * | 2/1993 | Bensel et al. | 385/135 |
| 5,214,730 A | 5/1993 | Nagasawa et al. | |
| 5,229,851 A | 7/1993 | Rahman | |
| 5,345,525 A | 9/1994 | Holman et al. | |
| 5,345,526 A | 9/1994 | Blew | |
| 5,448,670 A | 9/1995 | Blew et al. | |
| 5,557,698 A | 9/1996 | Gareis et al. | |
| 5,627,932 A | 5/1997 | Kiel et al. | |
| 5,737,470 A | 4/1998 | Nagano et al. | |
| 5,802,231 A | 9/1998 | Nagano et al. | |
| 5,838,864 A | 11/1998 | Patel et al. | |
| 5,970,196 A | 10/1999 | Greveling et al. | |
| 5,978,536 A | 11/1999 | Brandi et al. | |
| 5,982,966 A | 11/1999 | Bonicel | |
| 6,010,249 A * | 1/2000 | Melchior et al. | 385/77 |
| 6,014,487 A | 1/2000 | Field et al. | |
| 6,088,499 A | 7/2000 | Newton et al. | |
| 6,137,936 A | 10/2000 | Fitz et al. | |
| 6,249,628 B1 | 6/2001 | Rutterman et al. | |
| 6,256,438 B1 | 7/2001 | Gimblet | |
| 6,321,012 B1 | 11/2001 | Shen | |
| 6,347,172 B1 | 2/2002 | Keller et al. | |
| 6,356,690 B1 | 3/2002 | McAlpine et al. | |
| 6,370,303 B1 | 4/2002 | Fitz et al. | |
| 6,434,307 B1 | 8/2002 | Church | |
| 6,493,491 B1 | 12/2002 | Shen et al. | |
| 6,501,888 B2 | 12/2002 | Gimblet et al. | |
| 6,542,674 B1 | 4/2003 | Gimblet | |
| 6,546,175 B1 | 4/2003 | Wagman et al. | |
| 6,621,964 B2 | 9/2003 | Quinn et al. | |
| 6,701,047 B1 | 3/2004 | Rutterman et al. | |
| 6,714,710 B2 | 3/2004 | Gimblet | |
| 6,744,954 B1 | 6/2004 | Tanaka et al. | |
| 6,807,347 B2 | 10/2004 | McAlpine et al. | |
| 6,813,422 B1 | 11/2004 | Krishnamurthy et al. | |
| 6,836,603 B1 | 12/2004 | Bocanegra et al. | |
| 6,901,191 B2 | 5/2005 | Hurley et al. | |
| 6,928,217 B2 | 8/2005 | Mohler et al. | |
| 6,937,801 B2 | 8/2005 | McAlpine et al. | |
| 7,113,680 B2 | 9/2006 | Hurley et al. | |
| 7,197,215 B2 | 3/2007 | Baird et al. | |
| 7,218,821 B2 | 5/2007 | Bocanegra et al. | |
| 7,349,642 B2 | 3/2008 | Tatematsu et al. | |
| 7,379,642 B2 | 5/2008 | Kachmar | |
| 7,454,107 B2 | 11/2008 | Miller et al. | |
| 7,458,103 B2 | 12/2008 | Citterio et al. | |
| 7,566,474 B2 | 7/2009 | Kachmar | |
| 7,587,111 B2 | 9/2009 | de Montmorillon et al. | |
| 7,623,747 B2 | 11/2009 | de Montmorillon et al. | |
| 7,693,375 B2 | 4/2010 | Freeland et al. | |
| 8,031,996 B2 | 10/2011 | Willemsen et al. | |
| 8,041,166 B2 | 10/2011 | Kachmar | |
| 8,290,320 B2 | 10/2012 | Kachmar | |
| 2006/0159407 A1 | 7/2006 | Kachmar | |
| 2006/0291787 A1 | 12/2006 | Seddon | |
| 2007/0127878 A1 | 6/2007 | de Montmorillon et al. | |
| 2007/0280615 A1 | 12/2007 | de Montmorillon et al. | |
| 2008/0187276 A1 | 8/2008 | Roberts et al. | |
| 2009/0297104 A1 | 12/2009 | Kachmar | |
| 2009/0317039 A1 | 12/2009 | Blazer et al. | |
| 2009/0317047 A1 | 12/2009 | Smith et al. | |
| 2010/0046894 A1 | 2/2010 | Kachmar | |
| 2010/0278493 A1 | 11/2010 | Kachmar | |
| 2013/0202260 A1 | 8/2013 | Kachmar | |

FOREIGN PATENT DOCUMENTS

| | | |
|---|---|---|
| GB | 1 483 845 | 8/1977 |
| GB | 2 096 343 A | 10/1982 |
| GB | 2 296 575 A | 7/1996 |
| WO | WO 96/15466 | 5/1996 |

OTHER PUBLICATIONS

Fiber Optic Cable Ruggedized Simplex and Duplex Cables, Spec Sheet, ADC Telecommunications, Inc., 4 pages (Oct. 2005).

Fiber Optic Cable Tactical Cables, Spec Sheet, ADC Telecommunications, Inc., 4 pages (Oct. 2005).

FTTP Tight Buffered Indoor/Outdoor Drop, Series W7, Product Bulletin, OSP Fiber Products, Superior Essex, 2 pages (Nov. 2008).

* cited by examiner

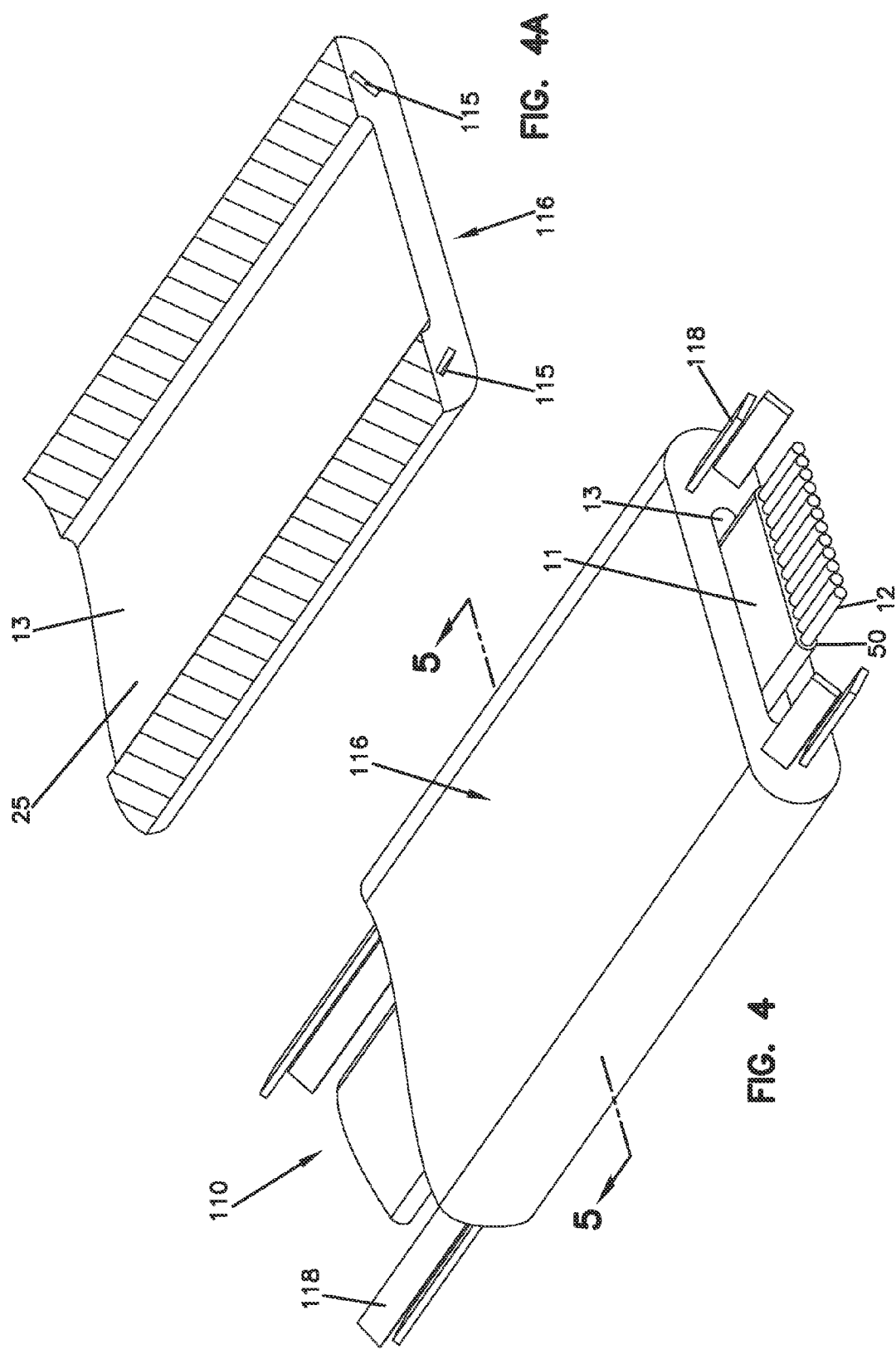

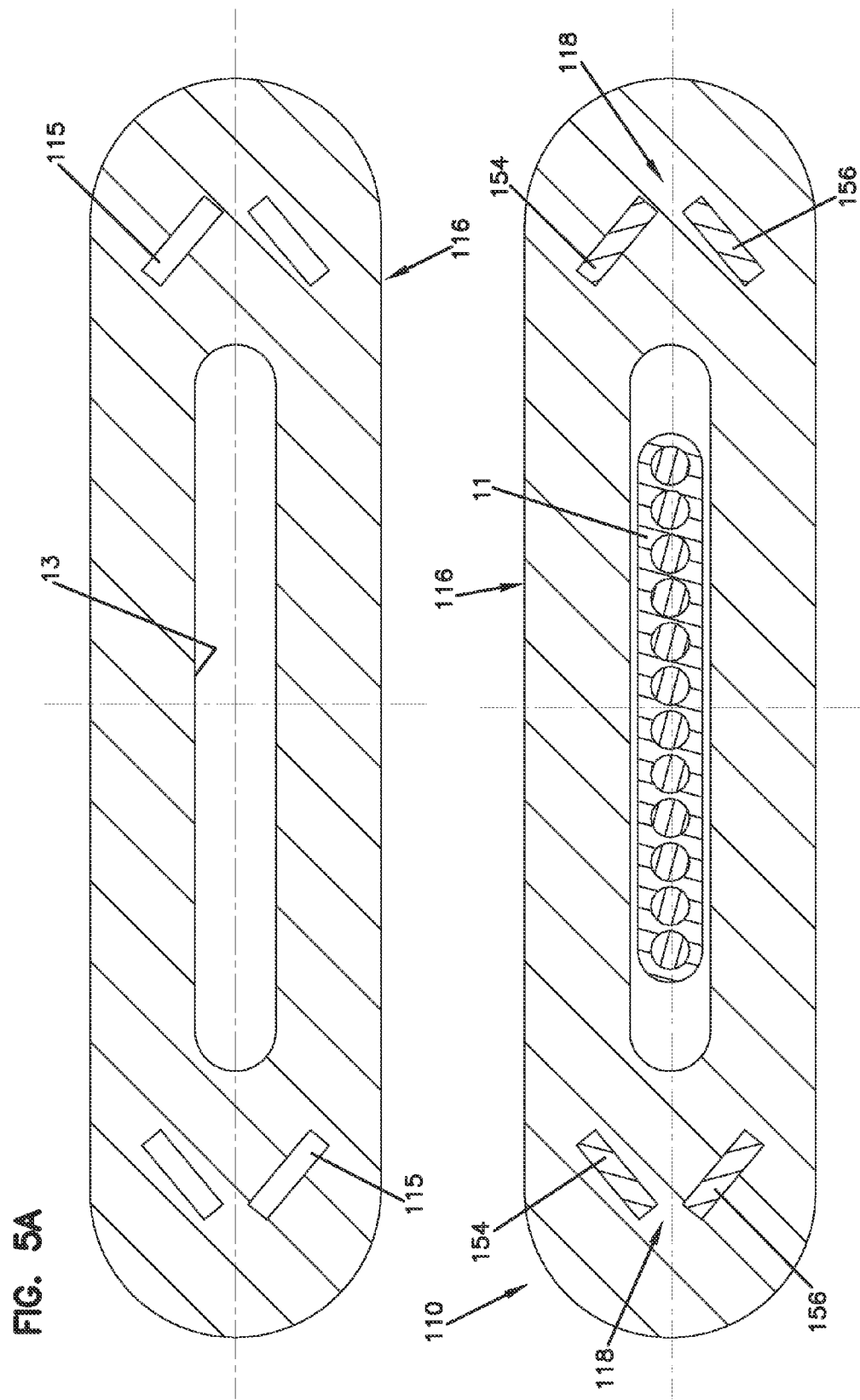

DROP CABLE WITH ANGLED REINFORCING MEMBER CONFIGURATIONS

CROSS-REFERENCE TO RELATED APPLICATION

The present application claims the benefit of U.S. Provisional Patent Application Ser. No. 61/510,334, filed Jul. 21, 2011, which application is hereby incorporated by reference in its entirety.

TECHNICAL FIELD

The present disclosure relates to telecommunication cable. More particularly, the present disclosure relates to fiber optic cable for use in a communication network.

BACKGROUND

A fiber optic cable typically includes: (1) an optical fiber; (2) a buffer layer that surrounds the optical fiber; (3) a plurality of reinforcing members loosely surrounding the buffer layer; and (4) an outer jacket. Optical fibers function to carry optical signals. A typical optical fiber includes an inner core surrounded by a cladding that is protected by a coating. The buffer layer functions to surround and protect the coated optical fibers. Reinforcing members add mechanical reinforcement to fiber optic cables to protect the internal optical fibers against stresses applied to the cables during installation and thereafter. Outer jackets also provide protection against chemical damage.

Drop cables used in fiber optic networks can be constructed having a jacket with a flat transverse profile. Such cables typically include a central buffer tube containing a plurality of optical fibers and reinforcing members such as rods made of glass reinforced epoxy embedded in the jacket on opposite sides of the buffer tube. U.S. Pat. No. 6,542,674 discloses a drop cable of a type described above.

SUMMARY

One aspect of the present disclosure relates to a configuration for a fiber optic cable including a reinforcing member configuration adapted for allowing a size of a central fiber passage of the fiber optic cable to be enlarged in transverse cross-sectional area.

Another aspect of the present disclosure relates to a fiber optic cable that includes an outer jacket, an optical fiber ribbon, and reinforcing member configurations. The outer jacket has an elongated transverse cross-sectional profile that defines a major axis and a minor axis that meet at a lengthwise axis of the fiber optic cable. The elongated transverse cross-sectional profile has a width that extends along the major axis and a thickness that extends along the minor axis. The width of the elongated transverse cross-sectional profile is longer than the thickness of the elongated transverse cross-sectional profile. The outer jacket also defines a central fiber passage that extends through the outer jacket along a lengthwise axis of the outer jacket. The central fiber passage is centered about the lengthwise axis of the outer jacket and is elongated along the major axis of the elongated transverse cross-sectional profile of the outer jacket. The optical fiber ribbon is positioned within the central fiber passage. The reinforcing member configurations are positioned within the outer jacket on opposite sides of the central fiber passage. Each of the reinforcing member configurations has a transverse cross-sectional profile that includes first and second legs that are angled relative to one another such that the first and second legs diverge as the first and second legs extend toward the minor axis. The first and second legs may or may not be connected at the major axis.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 1A is a cross-sectional perspective view with the same orientation as FIG. 1 of a jacket of the fiber optic cable of FIG. 1;

FIG. 2A is the transverse cross-sectional view of FIG. 2, but showing only the jacket of FIG. 1A;

FIG. 4 is a partially cut-away perspective view of another fiber optic cable in accordance with the principles of the present disclosure;

FIG. 4A is a cross-sectional perspective view with the same orientation as FIG. 4 of a jacket of the fiber optic cable of FIG. 4;

FIG. 5 is a transverse cross-sectional view taken along section line 5-5 of the fiber optic cable of FIG. 4; and FIG. 5A is the transverse cross-sectional view of FIG. 5, but showing only the jacket of FIG. 4A.

DETAILED DESCRIPTION

Figure 1:
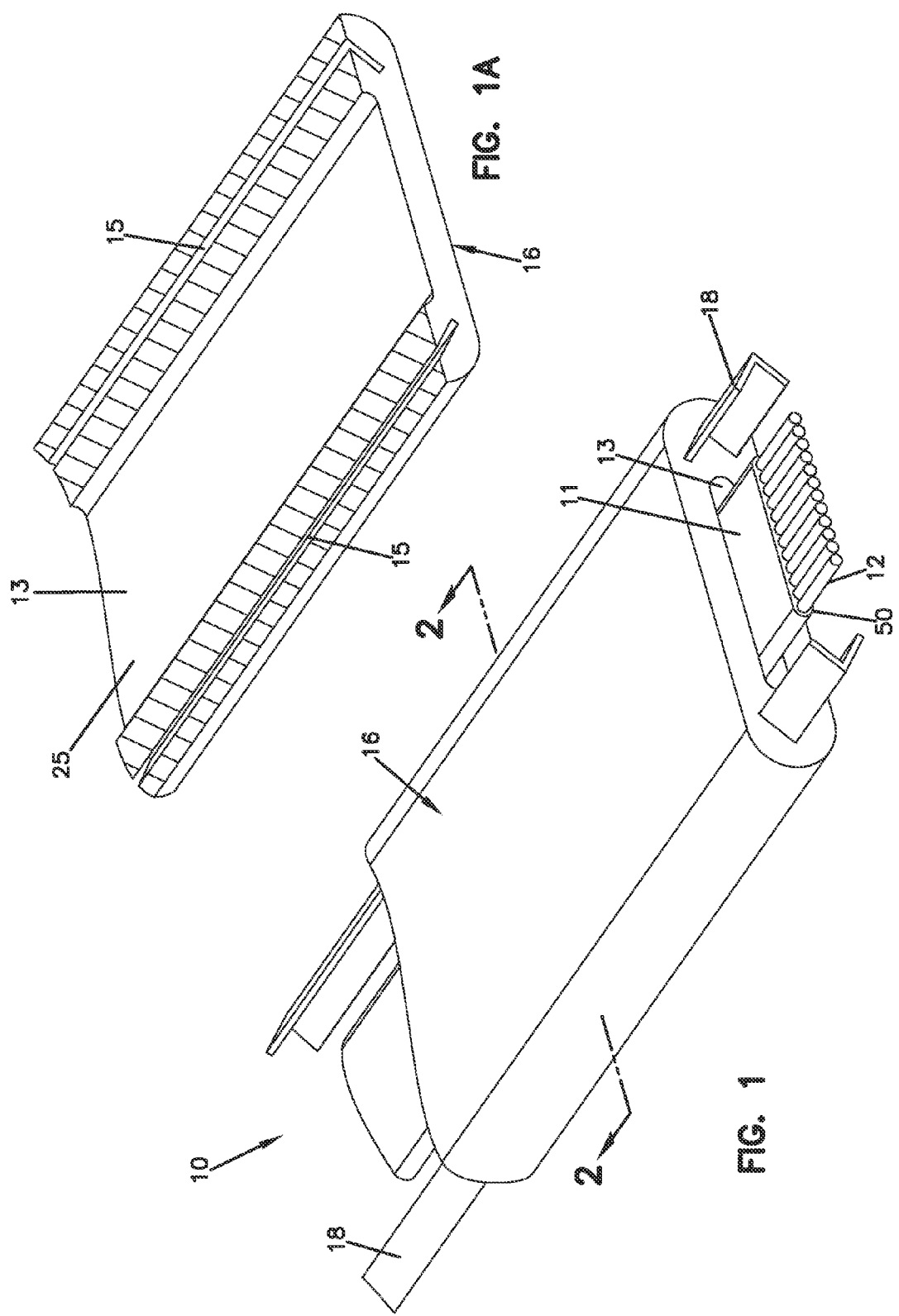
FIG. 1 is a partially cut-away perspective view of a fiber optic cable in accordance with the principles of the present disclosure.
Figure 2:
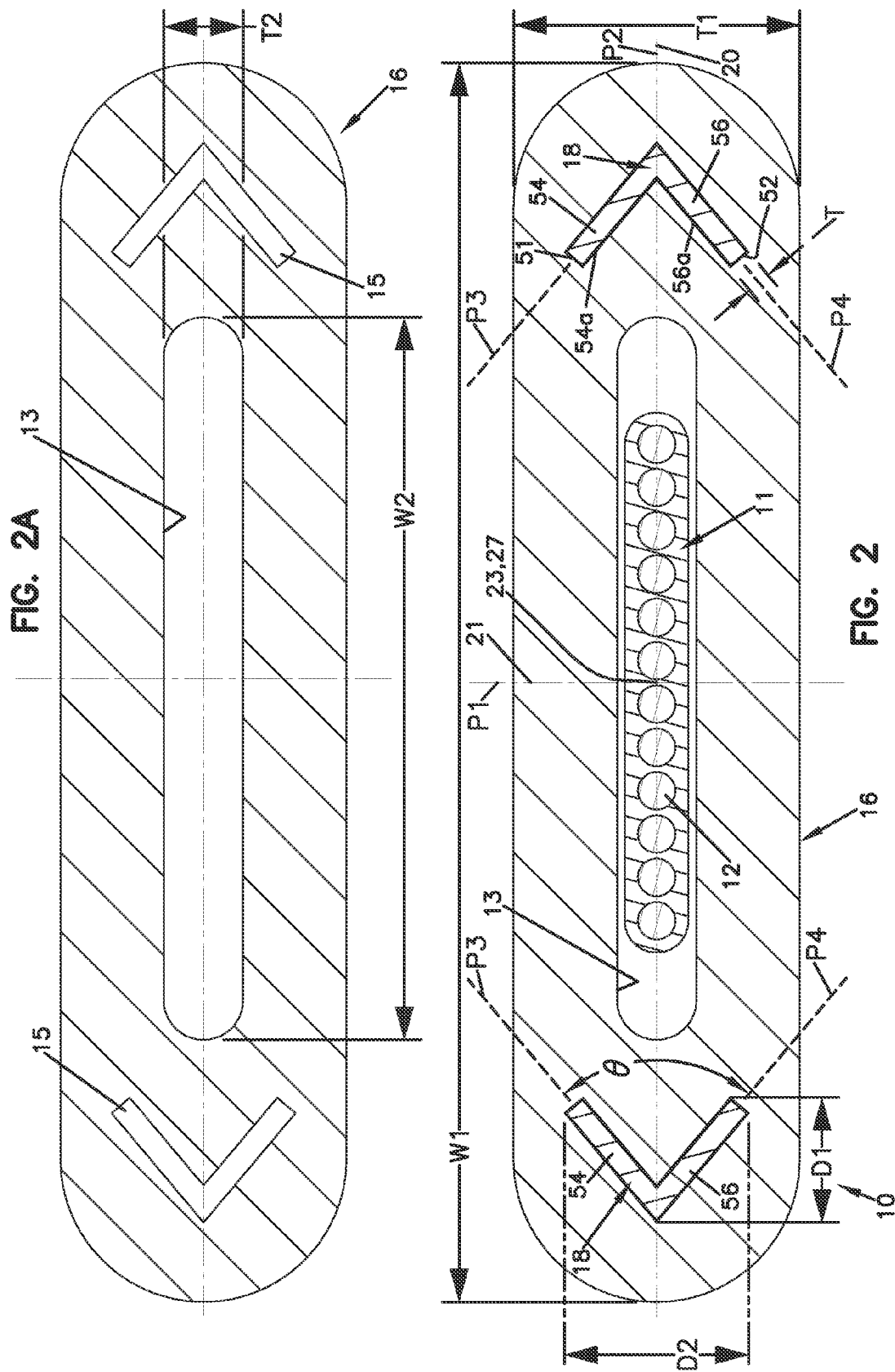
FIG. 2 is a transverse cross-sectional view taken along section line 2-2 of the fiber optic cable of FIG. 1.

FIGS. 1 and 2 show a fiber optic cable 10 in accordance with the principles of the present disclosure. The fiber optic cable 10 includes an optical fiber ribbon 11 including a plurality of optical fibers 12 (e.g., 12 optical fibers). The optical fibers 12 of the optical fiber ribbon 11 are mechanically bound (i.e., linked, coupled, secured, etc.) together in a row by a binding material 50 (i.e., a matrix material, a substrate material, etc.). The optical fiber ribbon 11 is contained within a fiber passage 13 defined by an outer jacket 16 of the fiber optic cable 10. In the depicted embodiment, the optical fiber ribbon 11 is positioned directly within the fiber passage 13 and is not positioned within a separate buffer tube positioned within the fiber passage 13. In other embodiments, an intermediate buffing layer (e.g., a buffer tube) can be positioned between the optical fiber ribbon 11 and the outer jacket 16. A material such as gel can be provided within the fiber passage 13 for providing water blocking and for centering the optical fiber ribbon 11 within the fiber passage 13. Reinforcing members 18 are embedded in the outer jacket 16 on opposite sides of the fiber passage 13 to provide the fiber optic cable 10 with axial reinforcement (e.g., resistance to both tensile and compressive loading).

Referring to FIG. 2, the outer jacket 16 has a non-circular outer profile. For example, as shown at FIG. 2, when viewed in transverse cross-section, the outer profile of the outer jacket 16 has a flat generally obround or rectangular shape. The outer jacket 16 is longer along a major axis 20 than along a minor axis 21. The major and minor axes 20, 21 are perpendicular to one another and intersect at a center 27 of the outer jacket 16. The fiber optic cable 10 has an elongated transverse cross-sectional profile (e.g., a flattened cross-sectional profile, an oblong cross-sectional profile, an obround cross-sectional profile, etc.) defined by the outer jacket 16. A width W1 of the outer jacket 16 extends along the major axis 20 and a thickness T1 of the outer jacket 16 extends along the minor axis 21. The width W1 is longer than the thickness T1. In certain embodiments, the width W1 is at least 50 percent longer than the thickness T1. The transverse cross-sectional profile defined by the outer jacket 16 is generally rectangular with rounded ends. The major axis 20 and the minor axis 21 intersect perpendicularly at a lengthwise axis 23 of the fiber optic cable 10 which coincides with the center 27. The reinforcing members 18 have lengths that extend along the lengthwise axis 23 of the fiber optic cable 10.

The construction of the fiber optic cable 10 allows the fiber optic cable 10 to be bent more easily along a plane P1 that coincides with the minor axis 21 than along a plane P2 that coincides with the major axis 20. Thus, when the fiber optic cable 10 is wrapped around a spool or guide, the fiber optic cable 10 is preferably bent along the plane P1 (i.e., the center 27 remains on the plane P1).

It will be appreciated that the outer jacket 16 of the fiber optic cable 10 can be shaped through an extrusion process and can be made by any number of different types of polymeric materials. In certain embodiments, the outer jacket 16 can have a construction that resists post-extrusion shrinkage of the outer jacket 16. For example, the outer jacket 16 can include a shrinkage reduction material disposed within a polymeric base material (e.g., polyethylene). U.S. Pat. No. 7,379,642, which is hereby incorporated by reference in its entirety, describes an exemplary use of shrinkage reduction material within the base material of a fiber optic cable jacket.

In one embodiment, the shrinkage reduction material is a liquid crystal polymer (LCP). Examples of liquid crystal polymers suitable for use in fiber-optic cables are described in U.S. Pat. Nos. 3,911,041; 4,067,852; 4,083,829; 4,130,545; 4,161,470; 4,318,842; and 4,468,364 which are hereby incorporated by reference in their entireties. To promote flexibility of the fiber optic cable 10, the concentration of the shrinkage reduction material (e.g. LCP) is relatively small as compared to the base material. In one embodiment, and by way of example only, the shrinkage reduction material constitutes less than about 10% of the total weight of the outer jacket 16. In another embodiment, and by way of example only, the shrinkage reduction material constitutes less than about 5% of the total weight of the outer jacket 16. In another embodiment, the shrinkage reduction material constitutes less than about 2% of the total weight of the outer jacket 16. In another embodiment, shrinkage reduction material constitutes less than about 1.9%, less than about 1.8%, less than 1.7%, less than about 1.6%, less than about 1.5%, less than about 1.4%, less than about 1.3%, less than about 1.2%, less than about 1.1%, or less than about 1.0% of the total weight of the outer jacket 16.

Example base materials for the outer jacket 16 include low-smoke zero halogen materials such as low-smoke zero halogen polyolefin and polycarbon. In other embodiments, the base material can include thermal plastic materials such as polyethylene, polypropylene, ethylene-propylene, copolymers, polystyrene and styrene copolymers, polyvinyl chloride, polyamide (i.e., nylon), polyesters such as polyethylene terephthalate, polyetheretherketone, polyphenylene sulfide, polyetherimide, polybutylene terephthalate, as well as other plastic materials. In still other embodiments, the outer jacket 16 can be made of low density, medium density or high density polyethylene materials. Such polyethylene materials can include low density, medium density or high density ultra-high molecular weight polyethylene materials.

Referring still to FIG. 2, the fiber passage 13, defined by the outer jacket 16, comprises a single fiber passage that is centered within the outer jacket 16. The fiber passage 13 has an elongated shape/profile when viewed in transverse cross-section. The fiber passage 13 is elongated along the major axis 20. In the depicted embodiment, a width W2 of the fiber passage 13 is at least 50 percent as long as the width W1 of the fiber optic cable 10. The fiber passage 13 is defined by an inner surface 25 of the outer jacket 16 that extends through a length of the fiber optic cable 10 along the lengthwise axis 23 of the fiber optic cable 10. It is preferred for the fiber passage 13 to be filled with a water-blocking gel. Additionally, other structures for preventing water from migrating along the fiber passage 13 (e.g., water-swellable fibers, water-swellable tape, or water-swellable yarn) can be provided within the fiber passage 13 along with the optical fibers 12.

Referring now to FIGS. 1 and 2, one or more of the optical fibers 12 can be positioned within the fiber passage 13. In a preferred embodiment, the fiber passage 13 contains at least twelve of the optical fibers 12 bound together to form the optical fiber ribbon 11. The optical fibers 12 are preferably unbuffered and in certain embodiments have outer diameters $D_3$ in a range of 230-270 micrometers (μm).

Figure 3:
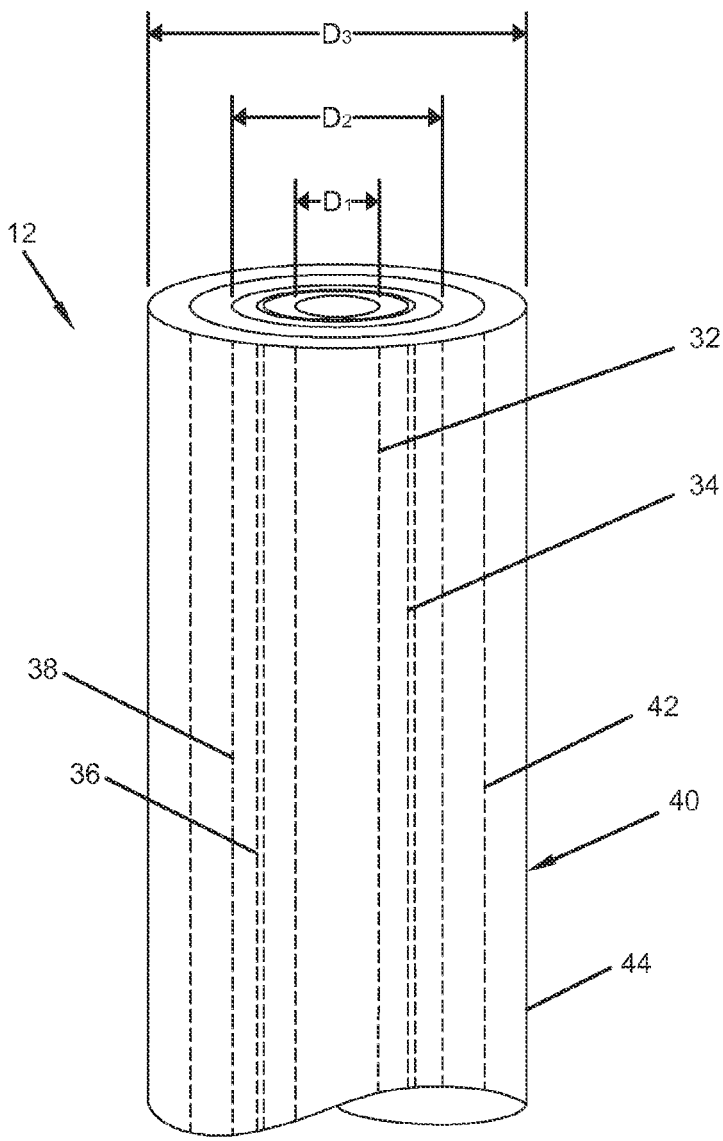
FIG. 3 is a perspective view of an optical fiber suitable for use in the fiber optic cable of FIG. 1.

It will be appreciated that the optical fibers 12 can have any number of different types of configurations. In the embodiment of FIG. 3, the optical fiber 12 includes a core 32. The core 32 is made of a glass material, such as a silica-based material, having an index of refraction. In the subject embodiment, the core 32 has an outer diameter $D_1$ of less than or equal to about 10 μm.

The core 32 of each of the optical fibers 12 is surrounded by a first cladding layer 34 that is also made of a glass material, such as a silica based-material. The first cladding layer 34 has an index of refraction that is less than the index of refraction of the core 32. This difference between the index of refraction of the first cladding layer 34 and the index of refraction of the core 32 allows an optical signal that is transmitted through the optical fiber 12 to be confined to the core 32.

A trench layer 36 surrounds the first cladding layer 34. The trench layer 36 has an index of refraction that is less than the index of refraction of the first cladding layer 34. In the subject embodiment, the trench layer 36 is immediately adjacent to the first cladding layer 34.

A second cladding layer 38 surrounds the trench layer 36. The second cladding layer 38 has an index of refraction. In the subject embodiment, the index of refraction of the second cladding layer 38 is about equal to the index of refraction of the first cladding layer 34. The second cladding layer 38 is immediately adjacent to the trench layer 36. In the subject embodiment, the second cladding layer 38 has an outer diameter $D_2$ of less than or equal to about 125 μm.

A coating, generally designated 40, surrounds the second cladding layer 38. The coating 40 includes an inner layer 42 and an outer layer 44. In the subject embodiment, the inner layer 42 of the coating 40 is immediately adjacent to the second cladding layer 38 such that the inner layer 42 surrounds the second cladding layer 38. The inner layer 42 is a polymeric material (e.g., polyvinyl chloride, polyethylenes, polyurethanes, polypropylenes, polyvinylidene fluorides, ethylene vinyl acetate, nylon, polyester, or other materials) having a low modulus of elasticity. The low modulus of elasticity of the inner layer 42 functions to protect the optical fiber 12 from microbending.

The outer layer 44 of the coating 40 is a polymeric material having a higher modulus of elasticity than the inner layer 42. In the subject embodiment, the outer layer 44 of the coating 40 is immediately adjacent to the inner layer 42 such that the outer layer 44 surrounds the inner layer 42. The higher modulus of elasticity of the outer layer 44 functions to mechanically protect and retain the shape of the optical fiber 12 during handling. In another embodiment, the outer layer 44 has an outer diameter $D_3$ of less than or equal to about 275 μm.

In the subject embodiment, the optical fibers 12 are manufactured to reduce the sensitivity of the optical fibers 12 to micro or macro-bending (hereinafter referred to as "bend-insensitive"). Exemplary bend insensitive optical fibers have been described in U.S. Pat. Nos. 7,623,747 and 7,587,111 that are hereby incorporated by reference in their entirety. An exemplary bend-insensitive optical fiber is commercially available from Draka Comteq under the name BendBright XS. In other embodiments, the optical fibers 12 need not be bend insensitive optical fibers.

In certain embodiments, the reinforcing members 18 can include reinforcing rods that provide the fiber optic cable 10 with both tensile and compressive reinforcement. Such rods can have a glass reinforced polymer (GRP) construction. The glass reinforced polymer can include a polymer base material (e.g., epoxy) reinforced by a plurality of glass fibers such as E-glass, S-glass or other types of glass fiber.

As shown at FIG. 2, the reinforcing members 18 have transverse cross-sectional dimensions D1 that are parallel to the major axis 20 and transverse cross-sectional dimensions D2 that are parallel to the minor axis 21. The dimensions D2 are larger than the dimensions D1. The reinforcing members 18 have thicknesses T that are smaller than the first and second dimensions D1, D2. The thickness T is generally constant in size from a first end 51 for the transverse cross-sectional profile of the reinforcing member 18 to a second end 52 of the transverse cross-sectional profile. Thus, the reinforcing members 18 are formed by generally flat, sheet-like structures which have been shaped to a desired transverse cross-sectional profile. The reinforcing members 18 are depicted as having V-shaped transverse cross-sectional profiles with open sides of the V-shapes facing toward the fiber passage 13. This configuration allows the width W2 of the fiber passage 13 to extend a relatively large portion of the total width W1 of the fiber optic cable 10 without intersecting the reinforcing members 18.

Referring still to FIG. 2, the transverse cross-sectional profiles of the reinforcing members 18 define legs 54, 56 that are angled relative to one another so as to define an angle θ that is less than 180 degrees. The angle θ faces toward the fiber passage 13. The legs 54, 56 meet each other at the major axis 20 such that the transverse cross-sectional profiles of the reinforcing members 18 are bisected by the major axis 20. The legs 54, 56 are joined at the major axis 20. The legs 54, 56 are aligned along planes P3, P4 that are oriented at oblique angles relative to both the major axis 20 and the minor axis 21 and that cooperate to define the angle θ. The legs 54, 56 are angled to converge toward one another as the legs 54, 56 extend away from the minor axis 21 and to diverge from one another as the legs 54, 56 extend toward the minor axis 21. In certain embodiments, the dimensions D2 of the transverse cross-sectional profiles of the reinforcing members 18 are at least three times as long as the thicknesses T of the transverse cross-sectional profiles of the reinforcing members 18. The legs 54, 56 of each of the reinforcing members 18 include faces 54a, 56a that are angled to face partially toward one another and partially toward the fiber passage 13. A radius (not shown) may be defined between the legs 54, 56. The thickness T may be held constant in size as the reinforcing members 18 extend along the radius between the legs 54, 56.

In certain embodiments, the reinforcing members 18 are bonded to the outer jacket 16 (e.g., reinforcing member passages 15 of the outer jacket 16). The bonding between the reinforcing members 18 and the outer jacket 16 can be chemical bonding or thermal bonding. In one embodiment, the reinforcing members 18 may be coated with or otherwise provided with a material having bonding characteristics (e.g., ethylene acetate) to bond the reinforcing members 18 to the outer jacket 16.

In certain embodiments, the reinforcing members 18 can have a flexible construction that provides tensile reinforcement while providing minimal resistance to compressive loading. Further details of reinforcing members having such properties are disclosed at U.S. Patent Application Publication No. US 2010/0278493, which is hereby incorporated by reference in its entirety.

In certain embodiments, the reinforcing member 18 is formed by a generally flat layer of reinforcing elements (e.g., fibers or yarns such as aramid fibers or yarns) embedded or otherwise integrated within a binder to form a flat reinforcing structure (e.g., a structure such as a sheet-like structure, a film-like structure, or a tape-like structure). In one example embodiment, the binder is a polymeric material such as ethylene acetate acrylate (e.g., UV-cured, etc.), silicone (e.g., RTV silicone, etc.), polyester films (e.g., biaxially oriented polyethylene terephthalate polyester film, etc.), and polyisobutylene. In other example instances, the binder may be a matrix material, an adhesive material, a finish material, or another type of material that binds, couples, and/or otherwise mechanically links together reinforcing elements.

In other embodiments, the reinforcing member 18 can have a glass reinforced polymer (GRP) construction. The glass reinforced polymer can include a polymer base material reinforced by a plurality of glass fibers such as E-glass, S-glass or other types of glass fiber. The polymer used in the glass reinforced polymer is preferably relatively soft and flexible after curing. For example, in one embodiment, the polymer has a Shore A hardness less than 50 after curing. In other embodiments, the polymer has a Shore A hardness less than 46 after curing. In certain other embodiments, the polymer has a Shore A hardness in a range of about 34-46.

FIGS. 4 and 5 show another fiber optic cable 110 in accordance with the principles of the present disclosure. The fiber optic cable 110 has the same configuration as the fiber optic cable 10 except a modified reinforcing member configuration 118 has been provided on opposite sides of the fiber passage 13. The reinforcing member configuration 118 has a similar transverse cross-sectional profile as compared to the reinforcing members 18, except legs 154, 156 (i.e., portions, segments, parts) of the reinforcing member configuration 118 are formed by separate members that are not joined at the major axis of the fiber optic cable 110. Similar to the legs 54, 56, the legs 154, 156 each have a generally constant thickness and are angled relative to one another so as to diverge as the legs 154, 156 extend toward the minor axis of the fiber optic cable 110 and to converge as the legs 154, 156 extend away from the minor axis of the fiber optic cable 110. As illustrated at FIGS. 4A and 5A, an outer jacket 116 of the fiber optic cable 110 is similar to the outer jacket 16 except reinforcing member passages 115 match the reinforcing member configuration 118.

The above specification provides examples of how certain inventive aspects may be put into practice. It will be appreciated that the inventive aspects can be practiced in other ways than those specifically shown and described herein without departing from the spirit and scope of the inventive aspects of the present disclosure.

The invention claimed is:

1. A fiber optic cable comprising:

an outer jacket having an elongated transverse cross-sectional profile defining a major axis and a minor axis that meet at a lengthwise axis of the fiber optic cable, the elongated transverse cross-sectional profile having a width that extends along the major axis and a thickness that extends along the minor axis, the width of the elongated transverse cross-sectional profile being longer than the thickness of the elongated transverse cross-sectional profile, the outer jacket also defining a central fiber passage that extends through the outer jacket along a lengthwise axis of the outer jacket, the central fiber passage being centered about the lengthwise axis of the outer jacket and being elongated along the major axis of the elongated transverse cross-sectional profile of the outer jacket;

an optical fiber ribbon positioned within the central fiber passage; and reinforcing member configurations positioned within the outer jacket on opposite sides of the central fiber passage, each of the reinforcing member configurations having a transverse cross-sectional profile including first and second legs that are angled relative to one another such that the first and second legs diverge as the first and second legs extend toward the minor axis.

2. The fiber optic cable of claim 1, wherein the first and second legs are connected at the major axis.

\* \* \* \* \*